(12) United States Patent
Murayama

(10) Patent No.: US 8,139,648 B2
(45) Date of Patent: Mar. 20, 2012

(54) IMAGE PROCESSING APPARATUS AND IMAGE PROCESSING METHOD

(75) Inventor: Jun Murayama, Tokyo (JP)

(73) Assignee: Sony Corporation, Tokyo (JP)

( * ) Notice: Subject to any disclaimer, the term of this patent is extended or adjusted under 35 U.S.C. 154(b) by 1072 days.

(21) Appl. No.: 11/665,558

(22) PCT Filed: Sep. 14, 2005

(86) PCT No.: PCT/JP2005/017327
§ 371 (c)(1),
(2), (4) Date: Feb. 13, 2008

(87) PCT Pub. No.: WO2006/043392
PCT Pub. Date: Apr. 27, 2006

(65) Prior Publication Data
US 2008/0137727 A1    Jun. 12, 2008

(30) Foreign Application Priority Data
Oct. 18, 2004 (JP) ................................ 2004-302676

(51) Int. Cl.
*H04N 7/12* (2006.01)
(52) U.S. Cl. .................................. 375/240.27; 382/254
(58) Field of Classification Search .................. None
See application file for complete search history.

(56) References Cited

U.S. PATENT DOCUMENTS

| | | |
|---|---|---|
| 5,136,615 A | 8/1992 | Tanoi |
| 5,875,003 A | 2/1999 | Kato et al. |
| 6,373,992 B1 | 4/2002 | Nagao |
| 6,381,365 B2* | 4/2002 | Murakawa .................. 382/190 |
| 6,587,509 B1 | 7/2003 | Suzuki et al. |
| 6,868,190 B1* | 3/2005 | Morton ........................ 382/278 |
| 7,546,464 B2* | 6/2009 | Hayashi et al. ............... 713/176 |
| 7,889,939 B2* | 2/2011 | Llach et al. .................... 382/254 |
| 2002/0012465 A1* | 1/2002 | Fujimoto et al. .............. 382/199 |
| 2003/0128861 A1 | 7/2003 | Rhoads ........................ 382/100 |
| 2005/0105627 A1* | 5/2005 | Sun et al. ................. 375/240.29 |
| 2006/0215767 A1* | 9/2006 | Gomila et al. ........... 375/240.25 |
| 2006/0256853 A1 | 11/2006 | Schlockermann et al. |

FOREIGN PATENT DOCUMENTS

| | | |
|---|---|---|
| JP | 3-210889 | 9/1991 |
| JP | 8-163594 | 6/1996 |
| JP | 9-107549 | 4/1997 |
| JP | 11-250246 | 9/1999 |
| JP | 2002-359845 | 12/2002 |
| JP | 2005-80301 | 3/2005 |

* cited by examiner

*Primary Examiner* — Phirin Sam
(74) *Attorney, Agent, or Firm* — Frommer Lawrence & Haug LLP; William S. Frommer; Ellen Marcie Emas

(57) ABSTRACT

A basic pattern generating unit 81 generates a film grain basic pattern 86 in which the histogram of random noise is substantially the same as the film grain basic pattern information 53. The film grain basic pattern 86 is of (64×64) pixels and an area of (16×16) pixels is cut out and supplied to a multiplier 84. Strength information 88 is generated based on film grain strength information 54 produced on the encoding side and an average value 87 of a pixel value in the area of (16×16) pixels of decoded image information 42. The strength of basic pattern 86 is adjusted by this strength information 88. Film grain image 89 whose strength is adjusted is added to the area of (16×16) pixels of the decoded image information 42 by an adder 85 by the unit of pixel.

12 Claims, 16 Drawing Sheets

INPUT IMAGE

DECODED IMAGE

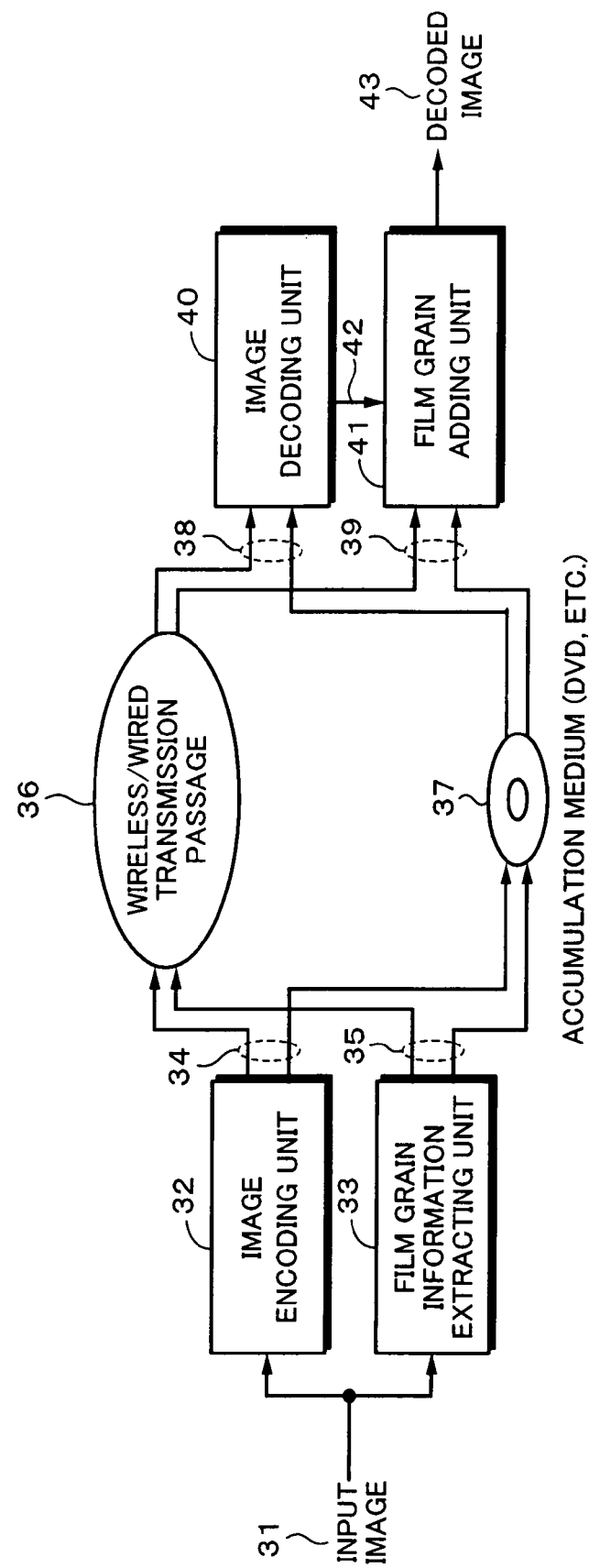

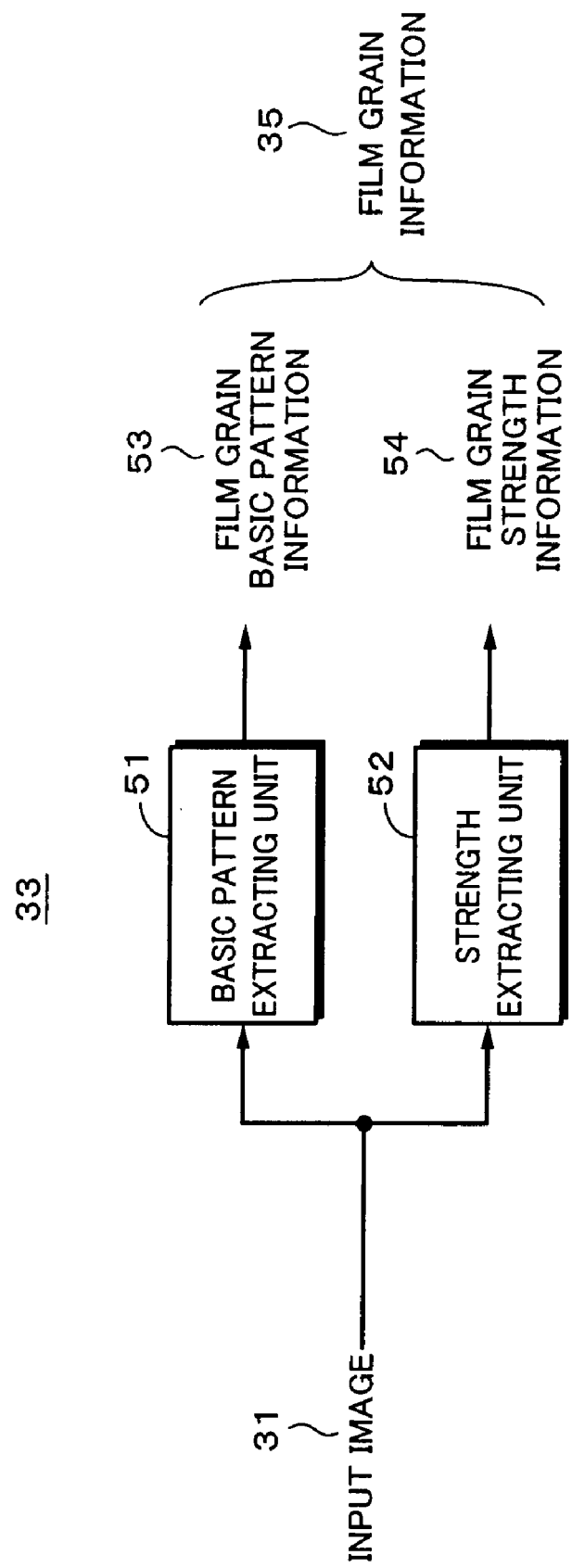

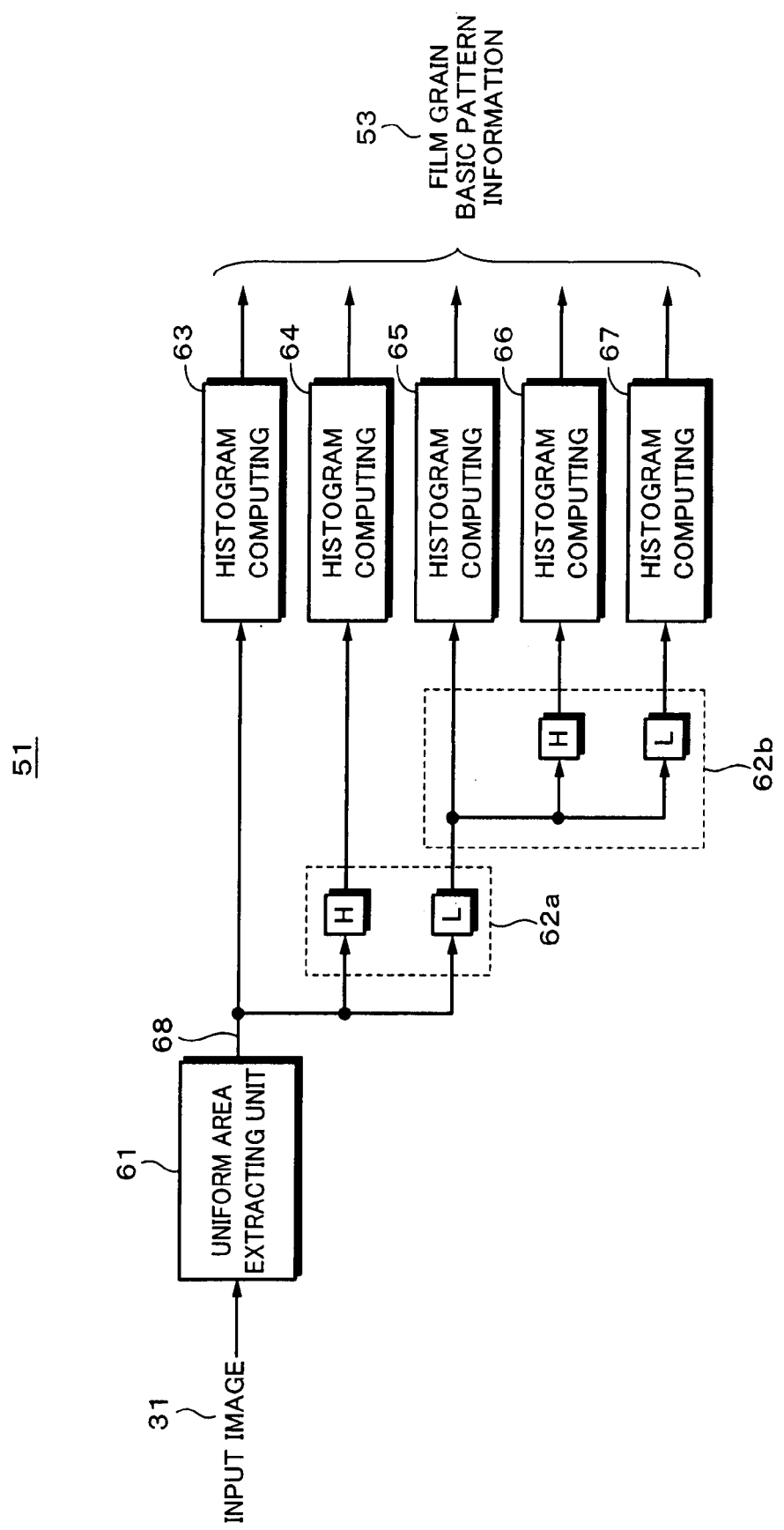

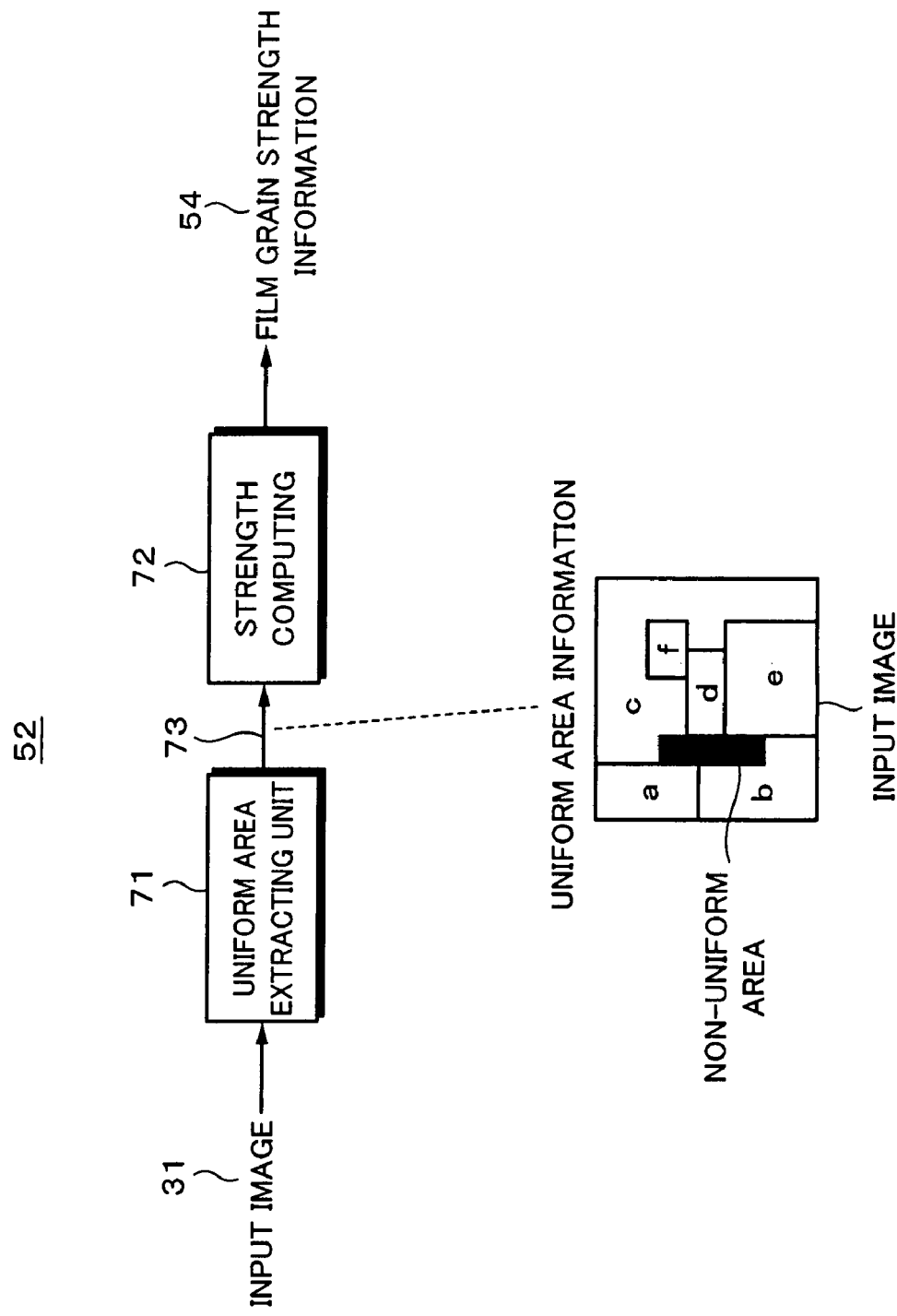

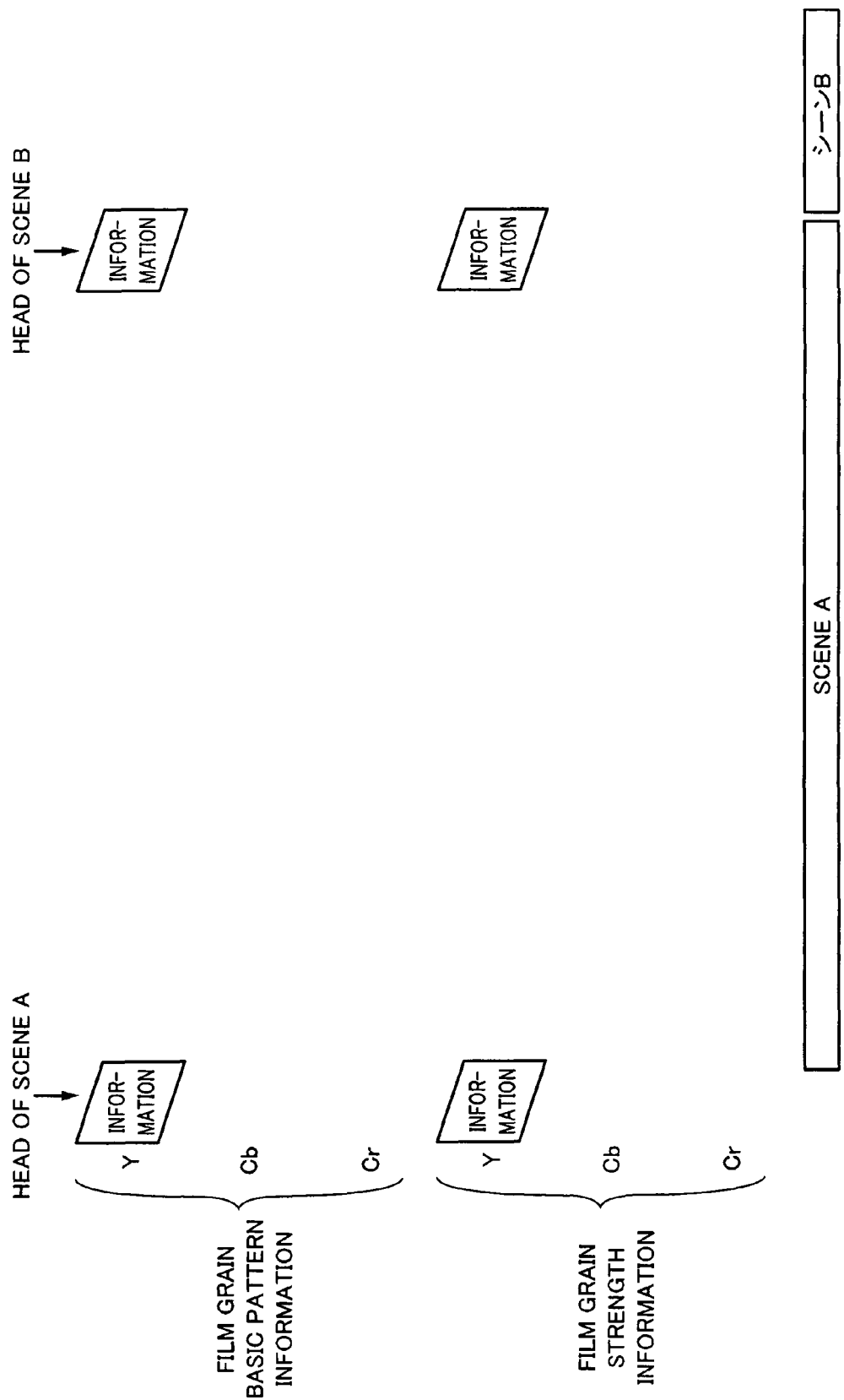

IMAGE PROCESSING APPARATUS AND IMAGE PROCESSING METHOD

TECHNICAL FIELD

The present invention relates to an image processing apparatus and image processing method which are applicable for a case of encoding, for example, a film image using MPEG-4 AVC (or H.264) encoding.

BACKGROUND ART

A conventional image transmitting/receiving apparatus or image recording/reproducing apparatus (hereinafter both will be referred to as just image transmitting apparatus) will be described with reference to FIG. 1. First, an input image 11 is encoded by an image encoding unit 12 and the encoded information is sent or recorded to or in a wireless/wired transmission passage 13 or an accumulation medium 14 corresponding to a transmission system. Data obtained on a receiving/reproduction side is decoded by an image decoding unit 15 so as to obtain a decoded image 16.

After the amount of the input image data is reduced to one-severalth to one-several tenths by the image encoding unit 12, the data is sent or recorded. For example, the image data can be lowered to a transmission rate of 1.5 Mbps by MPEG-4 AVC (or H.264) encoding. Because of such encoding, a difference between the decoded image 16 and the input image 11 is recognized as deterioration by a man.

The conventional image transmitting apparatus reduces the amount of the input image data at the time of transmission or recording. Generally, the image encoding standard such as the MPEG-4 AVC (or H.264) encoding has stipulated a method of reducing the data amount effectively without remarkable deterioration for the human visual perception. However, under a limited transmission band width or storage capacity, the detail information of the image is damaged largely. Particularly, when transmitting or recording film images such as movie, film grain information which expresses a large amount of the texture of a movie is lost, so that the quality of decoded image is deteriorated remarkably.

FIG. 2A shows an example of film image applied as the input image 11, and FIG. 2B shows an example of the decoded image 16. As evident from FIGS. 2A and 2B, although the film grain which is detected as the quality of film can be perceived in the input image 21, the decoded image 22 presents a flat image because most of the film grain information is lost. Since the film grain is lost, there is a problem that the film texture cannot be sensed.

Conventionally, Japanese Patent Application Laid-Open (JP-A) No. 11-250246 has stated that the sharpness is stressed by suppressing noises of an image fetched in by a scanner.

The apparatus disclosed in JP-A-11-250246 intends to suppress the grain noise particular to the film image but not to improve the film image texture lost for encoding by high efficiency encoding system on the decoding side.

Accordingly, an object of the present invention is to provide an image processing apparatus and processing method in which loss of film grain information is hardly sensed on the decoding side so as to maintain the film texture of an input image, thereby consequently improving the image quality largely.

DISCLOSURE OF THE INVENTION

In order to solve the above problems, a first aspect of the present invention provides an image processing apparatus for high efficiency encoding of an input image signal, including:

area detecting means for detecting an area containing no steep change in an input image;

first extracting means for extracting basic pattern information indicating a level distribution of pixel values in the area detected by the area detecting means;

second extracting means for obtaining strength information indicating the strength of a film grain to be added; and means for transmitting or recording encoded data, the basic pattern information and the strength information. The invention also provides an image processing method on the encoding side to achieve processing of the apparatus on the encoding side described above.

A second aspect of the present invention provides an image processing apparatus for receiving or reproducing encoded data by high efficiency encoding, basic pattern information indicating a level distribution of pixel values in an area containing no steep change in the input image and strength information indicating an extent of adding film grain, including:

decoding means for decoding encoded data;

basic pattern generating means for reconstructing a film grain image by converting a level distribution of random noise to the same one as the level distribution indicated in the basic pattern information;

strength adjusting means for adjusting the strength of the film grain image according to the strength information; and adding means for adding the film grain image whose strength is adjusted to decoded image information obtained by the decoding means. The invention also provides an image processing method on the decoding side to achieve processing of the apparatus on the decoding side described above.

The present invention provides an image processing apparatus for high efficiency encoding an input image signal, transmitting or recording encoded data and decoding the received or reproduced encoded data, wherein the encoding side thereof includes:

area detecting means for detecting an area containing no steep change in an input image;

first extracting means for extracting basic pattern information indicating a level distribution of pixel values in the area detected by the area detecting means;

second extracting means for obtaining strength information indicating the strength of a film grain to be added; and means for transmitting or recording encoded data, the basic pattern information and the strength information, and the decoding side thereof includes:

means for receiving or reproducing the encoded data, the basic pattern information and the strength information;

basic pattern generating means for reconstructing a film grain image by converting a level distribution of random noise to the same one as the level distribution indicated in the basic pattern information;

strength adjusting means for adjusting the strength of the film grain image according to the strength information; and adding means for adding the film grain image whose strength is adjusted to decoded image information obtained by the decoding means. The invention also provides an image processing method on the encoding side and decoding side to achieve processing of the apparatus on the encoding side and decoding side described above.

BRIEF DESCRIPTION OF THE DRAWINGS

FIG. 3 is a block diagram schematically showing an embodiment of the image transmitting apparatus of the present invention;

FIG. 4 is a block diagram of an example of a film grain information extracting unit according to the embodiment of the present invention;

FIG. 5 is a block diagram of an example of a film grain basic pattern information extracting unit in the film grain extracting unit;

FIG. 6 is a block diagram of an example of a film grain strength information extracting unit in the film grain extracting unit;

FIG. 16 is a timing chart for explaining a sixth method of the film grain information extraction and film grain adding processing.

BEST MODE FOR CARRYING OUT THE INVENTION

Figure 1:
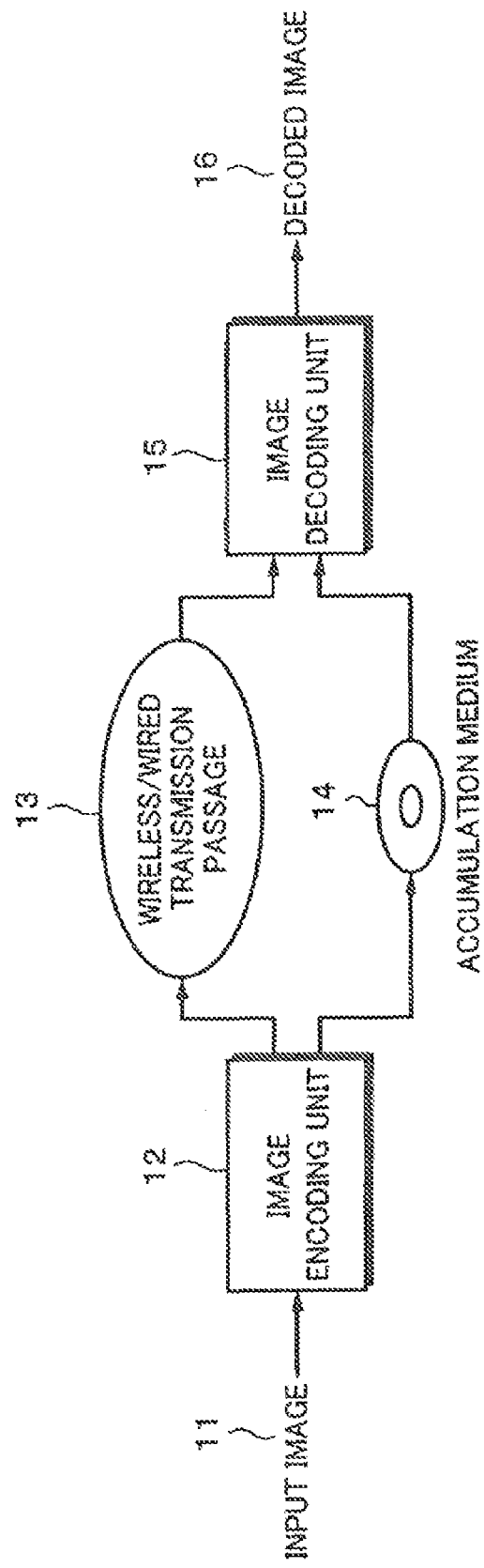
FIG. 1 is a block diagram showing an example of a conventional image transmitting apparatus to which the present invention can be applied.
Figure 2A:
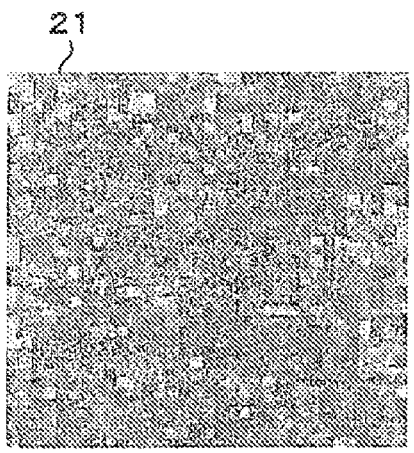
FIGS. 2A and 2B are schematic views showing an example of an input image and a decoded image in the conventional image transmitting apparatus.
Figure 2B:
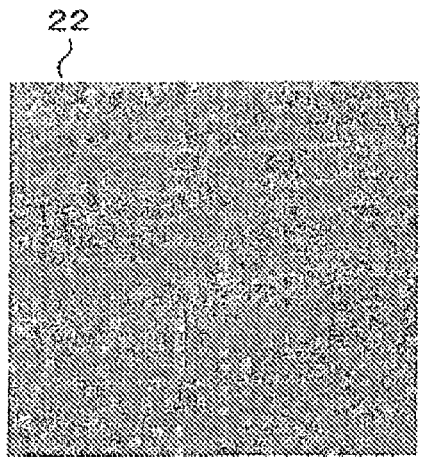

Hereinafter, one embodiment of the present invention will be described with reference to the accompanying drawings. FIG. 3 shows an image transmitting apparatus of the present invention. First, the encoding side will be described. An input image 31 is encoded highly efficiently by an image encoding unit 32 so as to generate encoded information 34 by compressing the data amount. The encoded information 34 is sent to a wireless/wired transmission passage 36 corresponding to a transmission system or recorded in an accumulation medium 37 such as a digital versatile disc (DVD).

Reference numeral 33 denotes a film grain information extracting unit. The film grain information extracting unit 33 extracts film grain information from the input image 31, and the extracted film grain information 35 is sent to the wireless/wired transmission passage 36 corresponding to the transmission system like the encoded information 34 or recorded in the accumulation medium 37.

Next, the decoding side will be described. Received encoded information 38 is supplied to an image decoding unit 40 on the decoding side, and the image decoding unit 40 generates decoded image information 42 from the received encoded information 38. Reference numeral 41 denotes a film grain adding unit. After the film grain adding unit 41 reproduces film gain information from the received film grain information 39, it adds film grain information reconstructed corresponding to the characteristic of the decoded image information 42 and outputs as decoded image 43.

The image encoding unit 32 and the image decoding unit 40 execute processing based on the MPEG-4 AVC (or H.264) encoding standard as an example. In this case, the encoding information 34 has a stream data structure including units of a predetermined length. The film grain information 35 is transmitted or recorded using a unit for transmitting Supplemental Enhancement Information (SEI), which is not indispensable for decoding an animation picture. That is, because the SEI contains information which a user defines independently, the film grain information 35 is transmitted or recorded using the user data.

FIG. 4 shows an example of the film grain extracting unit 33. The film grain extracting unit 33 is constituted of a basic pattern extracting unit 51 and a strength extracting unit 52. The basic pattern extracting unit 51 extracts information indicating film grain from the input image 31 and outputs as film grain basic pattern information 53. The strength extracting unit 52 computes information of how much strength is to be added to a film grain to be added to an area having an average value for every frame should have, in every range of the pixel value, for example, 0-20, 21-40, . . . and its information is outputted as the film grain strength information 54. The film grain information 35 includes both the film grain basic pattern information 53 and the film grain strength information 54.

FIG. 5 shows an example of the basic pattern extracting unit 51. The basic pattern extracting unit 51 is composed of a uniform area extracting unit 61, a filter bank 62 and histogram computing units 63, 64, 65, 66 and 67.

The uniform area extracting unit 61 extracts an area of a predetermined size (called uniform area) in which film grains are distributed uniformly and an image does not contain a steep change from the input image 31 and outputs uniform area data 68. An example of the uniform area is a flat image like sky image as a background. The uniform area data 68 is constituted of plural items of pixel data existing in a uniform area. In the meantime, to obtain the uniform area data 68, it is permissible to specify one directly or specify one from candidates outputted by the unit.

The uniform area data 68 obtained in this way is divided to a plurality of sub-bands by filter banks 62a, 62b constituted of plural high-pass filters (indicated with H) and low-pass filters (indicated with L). Filters which constitute the filter banks 62a, 62b are digital filters whose filter coefficient is specified two-dimensionally.

In a structure example shown in FIG. 5, each of the filter banks 62a, 62b is constituted of a high-pass band and a low-pass band. Additionally, a plurality of band pass filters may be provided, and as for the number of stage, multiple stages thereof may be provided instead of the two stages shown in FIG. 5.

Outputs of a base band and each sub-band are supplied to the histogram computing units 63 to 67 corresponding to each band. The frequency distribution information (hereinafter referred to as histogram) of the pixel value of each band is extracted by the histogram computing units 63 to 67 and the extracted histogram information is outputted as the film grain basic pattern information 53.

The histogram information is frequency information indicating the quantity of pixels contained in a predetermined pixel value range (hereinafter referred to as division section).

For example, assume that there exist four predetermined division sections, namely, −19 to −10, −9 to 0, 1 to +10, +11 to +20 and the value of each pixel of the input data into the histogram computing unit at that time is [−11, −5, −1, +3, +8, +14]. In this case, histogram information outputted is the frequency of pixel data contained in each range, that is, [1, 2, 2, 1]. The histogram information is outputted for each band.

FIG. 6 shows an exemplary configuration of the strength extracting unit 52. The strength extracting unit 52 includes a uniform area extracting unit 71 and a strength computing unit 72. A uniform area is extracted from the input image 31 by the uniform area extracting unit 71 like the uniform area extracting unit 61 and uniform area information 73 is outputted. In this case, regarding a steep area of the image, information distinguished from other uniform area is outputted as a non-uniform area. As indicated in FIG. 6, a, b, c, d, e and f in the input image are uniform areas while a filled area is a non-uniform area.

The uniform area information 73 is supplied to the strength computing unit 72. The strength computing unit 72 computes an average pixel value of the area and a distribution value of the film grain for each uniform area. To compute the distribution value of the film grain, for example, a method of using the distribution value of the pixel value within the uniform area may be used. Then, the film grain strength information 54 is computed using the average pixel value and the distribution value of the film grain. The film grain strength information 54 is an average value of the distribution of the film grain in the range of a predetermined area average value.

For example, assuming that the range of an average value of the pixel value in a predetermined area, for example, an area of (16×16) pixels is 0 to 15, 16 to 31, . . . , 240 to 255 and that a pair of an area average value and a distribution value in the uniform area of the input image is (area average value =28, distribution value=500), (30, 1000), (44, 400), (250, 20), the output film grain strength information is [0, 750(=(500+1000)/2, 400, . . . , 20). If the image is constituted of components R, G, B or Y, Cb and Cr, these are outputted for each component. The film grain strength information undergoes normalization processing such as turning to 1/1000, so that it is converted to a value suitable for being multiplied with a film grain basic pattern generated on the decoding side.

If the input image is constituted of the component video signal, for example, Y, Cb and Cr components, a method of detecting the film grain information with only brightness signal Y and adding film grain information generated in each of the components Y, Cb and Cr corresponding to a detection result and a method of detecting the film grain information for each component and adding the film grain information generated in each of the components Y, Cb and Cr corresponding to a detection result are available.

Figure 7A:
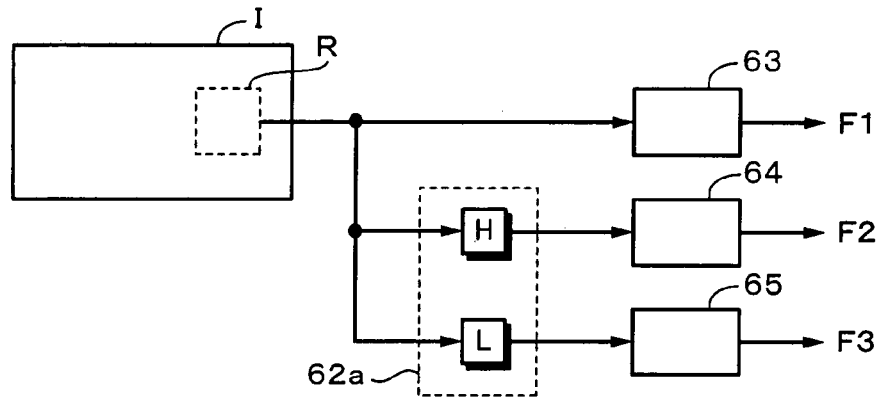
FIGS. 7A, 7B and 7C are schematic diagrams for schematically explaining extraction processing of the film grain basic pattern information.

The basic pattern extracting processing in the above-described encoding side processing will be described schematically with reference to FIGS. 7A to 7C. As shown in FIG. 7A, the uniform area R is detected from the input image I of a frame. The size of the uniform area R is assumed to be of a predetermined size, for example, (64×64) pixels. The pixels of the uniform area R are divided to a base band, low band and high band by the filter bank 62a. Although in the structure of FIG. 5, the low band is divided depending on the frequency by the filter bank 62b, FIGS. 7A to 7C show an example of using only the filter bank 62a for simplification of description.

Figure 7B:
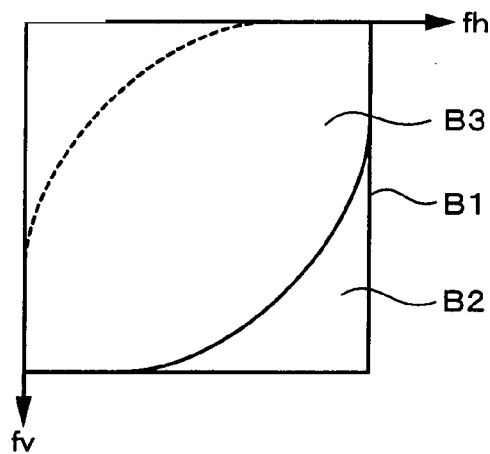

FIG. 7B shows an example of the frequency division. In FIG. 7B, its abscissa axis indicates spatial horizontal frequency and its ordinate axis indicates spatial vertical frequency. A rectangular area is base band B1, an area in which both horizontal and vertical frequencies are raised is high band B2 and an area in which both the horizontal and vertical frequencies are lowered is low band B3. A dotted line indicates positions of a border of the high band and a solid line indicates positions of a border of the low band. In this example, the frequency areas of the low band and high band overlap each other in the vicinity of the middle band.

The output data of each sub-band is supplied to the histogram computing units 63, 64 and 65. The histogram computing unit 63 computes a histogram concerning a base band indicated in F1 in FIG. 7C, the histogram computing unit 63 computes a histogram concerning the base band indicated in F1 in FIG. 7C, and the histogram computing unit 63 computes a histogram concerning a base band indicated in F1 in FIG. 7C.

Figure 7C:
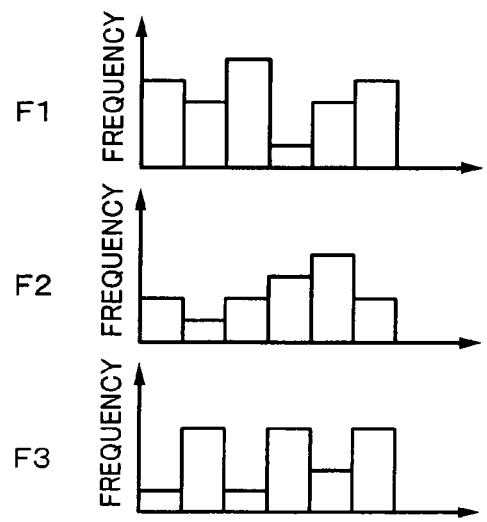

In FIG. 7C, the ordinate axis indicates the frequency and the abscissa axis indicates the division section of the pixel value. Each division section has a predetermined range of the pixel value for each band. The histograms F1, F2 and F3 indicate film grain basic pattern information.

In FIGS. 7A to 7C, the film grain strength information will not be described. As described above, the film grain strength information is an average value of the dispersion of film grains in the range of an average value of pixels value in a predetermined area and undergoes normalization processing as required.

Figure 8:
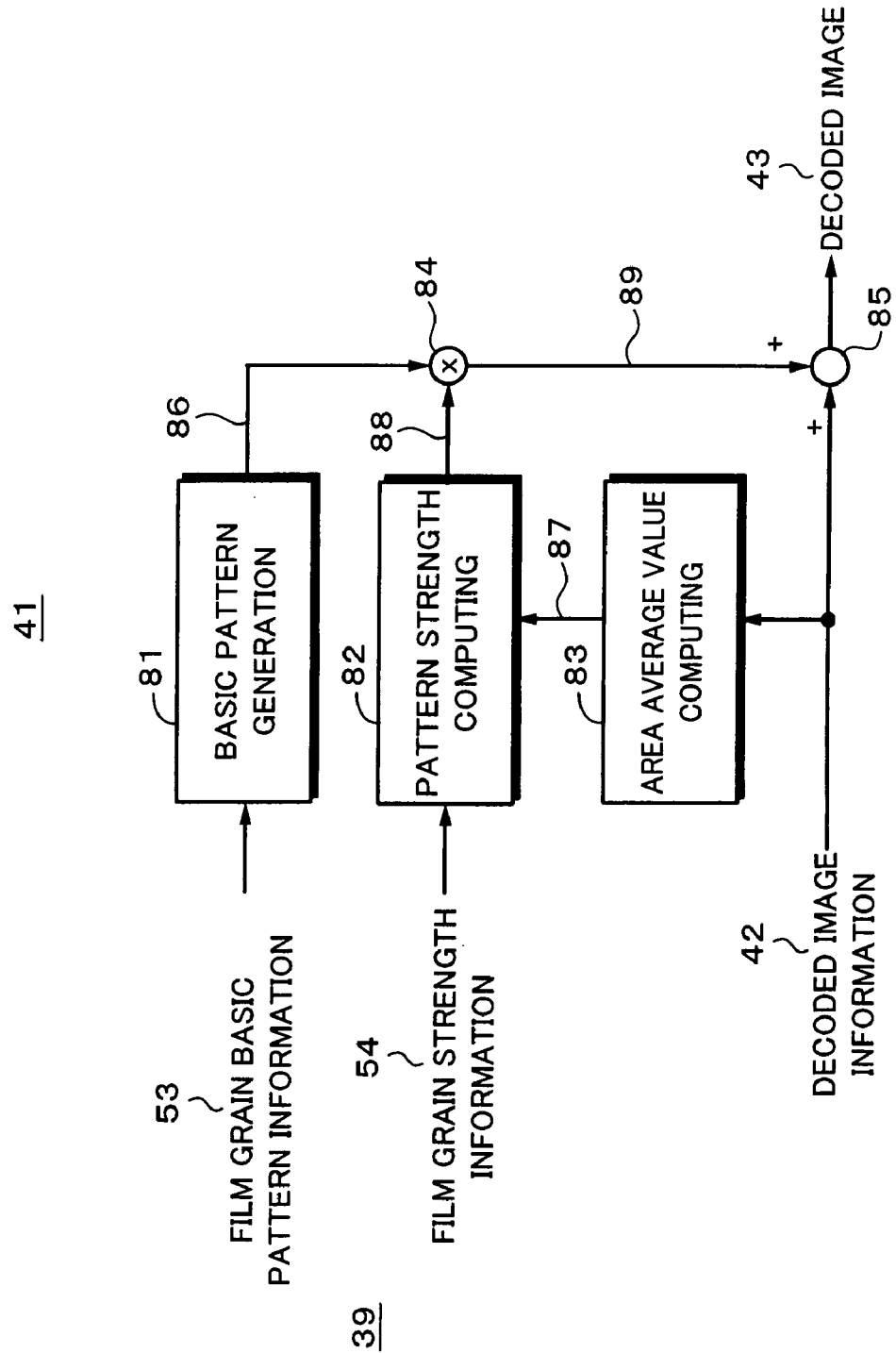
FIG. 8 is a block diagram of an example of a film grain adding unit according to the embodiment of the present invention.

Next, the structure and processing on the decoding side will be described. FIG. 8 shows an example of the film grain adding unit 41 on the decoding side. The film grain adding unit 41 is composed of a film grain basic pattern generating unit 81, a pattern strength computing unit 82, an area average value computing unit 83, a multiplier 84 and an adder 85. The basic pattern generating unit 81 generates a pattern of the film grain to be added to the decoded image information 42 from the film grain basic pattern information 53, and outputs a film grain basic pattern 86. The pattern of the film grain is assumed to be an area of the same size as an area to be set for extracting the basic pattern on the encoding side, for example, an area of (64×64) pixels.

The area average value computing unit 83 obtains an average value of pixel values in a predetermined area of the decoded image information 42, for example, an area of (16×16) pixels, and outputs an area average value 87. The area average value 87 is supplied to the pattern strength computing unit 82. The pattern strength computing unit 82 determines to which average section of the film grain strength information 54 the area average value 87 belongs and outputs a film grain strength corresponding to the section as film grain strength information 88.

For example, assuming that the ranges of the average values of predetermined areas are 0 to 15, 16 to 31, . . . , 240 to 255 and the film grain strength information 54 at that time is [0, 750, 400, . . . , 20], the film grain strength outputted at that time is 750 if the inputted area average value is 23. However, as described above, if the film grain strength information is subjected to normalization processing on the encoding side preliminarily, it is converted to a value which can be used for multiplication for strength adjustment. This normalization may be carried out on the decoding side.

The film grain basic pattern 86 is multiplied by the film grain strength information 88 and the multiplier 84. A reconstructed film grain image 89 is obtained from the multiplier 84. The film grain image 89 is added to the decoded image information 42 by the adder 89. The decoded image 43 is outputted from the adder 85. In the adder 85, pixels at a position in which the film grain image 89 corresponds to the (16×16) pixels of the decoded image information 42 in the unit of the (16×16) pixels are summed up. The film grain image 89 is cut out from the basic pattern of the (64×64) pixels generated by the basic pattern generating unit 81.

In the meantime, the film grain basic pattern 86 may be added by being shifted for every area unit to be supplied with the film grain pattern, for example, every 16×16 (pixels) in order to obtain uniformity on an image screen. For example, assuming that the area size is H×V and the pixel value of the pattern is G (h, v) (0≦h<H) (0≦v<V), a pattern shifted by a random number may be obtained by generating a random number randh, randv (0≦randh<H, 0≦randv<V) and then computing a pattern A to be actually added as followed. This pattern may be assumed to be film grain basic pattern 86.

$$A(h,v)=G \,(\mathrm{mod}(h+\mathrm{randh},H),\mathrm{mod}(v++\mathrm{randv},V))$$

Figure 9:
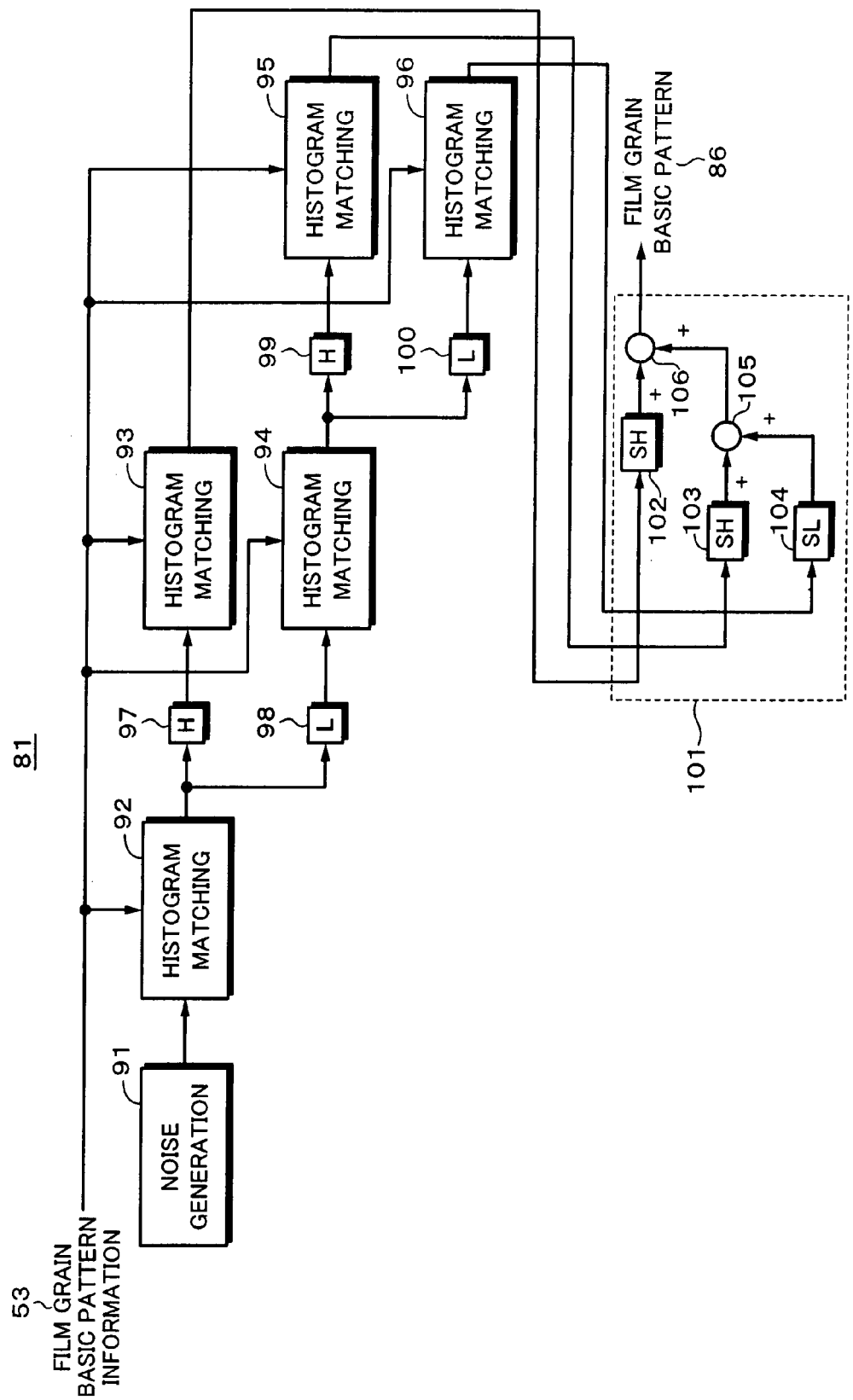
FIG. 9 is a block diagram of an example of a basic pattern generating unit in the film grain adding unit.

FIG. 9 shows an exemplary configuration of the film grain basic pattern generating unit 81. The basic pattern 81 includes a noise generating unit 91, histogram matching units 92, 93, 94, 95 and 96, high-pass filters 97 and 99, low-pass filters 98 and 100 and a synthesis filter bank 101.

The noise generating unit 91 generates noise (Gauss noise, random noise of uniform random numbers) of the same size (H×V) as the film grain basic pattern, for example, (64×64) pixels. Generated noise is supplied to the histogram matching unit 92. The histogram matching unit 92 converts noise so as to have substantially the same histogram as the film grain basic pattern information 53. An example of conversion algorithm in case where the histogram matching unit 92 is achieved by software processing is shown below.

[Histogram Matching Algorithm in the Histogram Matching Unit]

1. Assume that the minimum value and maximum value of the histogram to be a matching object in the film grain basic pattern information 53 are CMIN, CMAX and the quantity of division sections of the histogram between the CMIN and CMAX is number of bins. bins indicates a division section of the histogram. Further, assume that the cumulative distribution function of a histogram created, received or reproduced on the encoding side is CDF ref(bin) (0≦bin<number of bins−1).
2. Assume that the input signal (output of the noise generating unit 91) is val org (h, v) and the cumulative distribution function of the input signal is CDF org (bin) (0≦bin<number of bins−1).
3. For each factor of the input signal val org(h, v), val repl is obtained according to the following pseudo code and val org (h, v) is replaced with that value.

$$val=CDF\ org(((val\ org(h,v)-CMIN)/(CMAX-CMIN)\\ *(\text{number of bins}-1)));$$

for (i=0; i<number of bins; i++)
if (CDF ref(i)>=val)
break;
if (i==number of bins)i−−;

$$val\ repl=i/(\text{number of bins}-1)*(CMAX-CMIN)+\\ CMIN;$$

The other histogram matching units 93, 94, 95 and 96 have a histogram matching function of the above-described algorithm. An output signal of the histogram matching unit 92 is supplied to an analysis high-pass filter 97 and an analysis low-pass filter 98, an output of the analysis high-pass filter 97 is supplied to the histogram matching unit 93, and an output of the analysis low-pass filter 98 is supplied to the histogram matching unit 94.

Further, an output signal of the histogram matching unit 94 is supplied to an analysis high-pass filter 99 and an analysis low-pass filter 100, an output of the analysis high-pass filter 99 is supplied to the histogram matching unit 95, an output of the analysis low-pass filter 100 is supplied to the histogram matching unit 96.

The film grain basic pattern information 53 provides each of the histogram matching units 92 to 96 with different histogram information. The histogram information F1 in FIG. 7C is supplied to the histogram matching unit 92 because it concerns the base band. The histogram information F2 is supplied to the histogram matching unit 93 because it concerns a high band. The histogram information F3 is supplied to the histogram matching unit 94 because it concerns a low band.

Division of the sub-band is carried out by the analysis high-pass filters 97 and 99 and the analysis low-pass filters 98 and 100, components of each sub-band are supplied to the synthesis filter bank 101. The synthesis filter bank 101 includes a synthesis high-pass filter 102 to which an output signal of the histogram matching unit 93 is supplied, a synthesis high-pass filter 103 to which an output signal of the histogram matching unit 95 is supplied, and a synthesis low-pass filter 104 to which an output signal of the histogram matching unit 96 is supplied.

An output signal of the synthesis high-pass filter 103 and an output signal of the synthesis low-pass filter 104 are summed up by an adder 105, while an output signal of the synthesis high-pass filter 102 and an output signal of the adder 105 are summed up by an adder 106. The film grain basic pattern information 86 is fetched out to the output of the adder 106. In the meantime, the structure of the synthesis filter bank corresponds to the structure of the division of the sub-band on the encoding side.

The strength is corrected or adjusted by multiplying the film grain basic pattern information 86 with the film grain strength information 88 by means of the multiplier 84 as described above. The film grain image 89 after its strength is adjusted is added to the decoded image information 42, so that the high quality decoded image 43 having the film grain information lost by high efficiency encoding and decoding is obtained.

Figure 10:
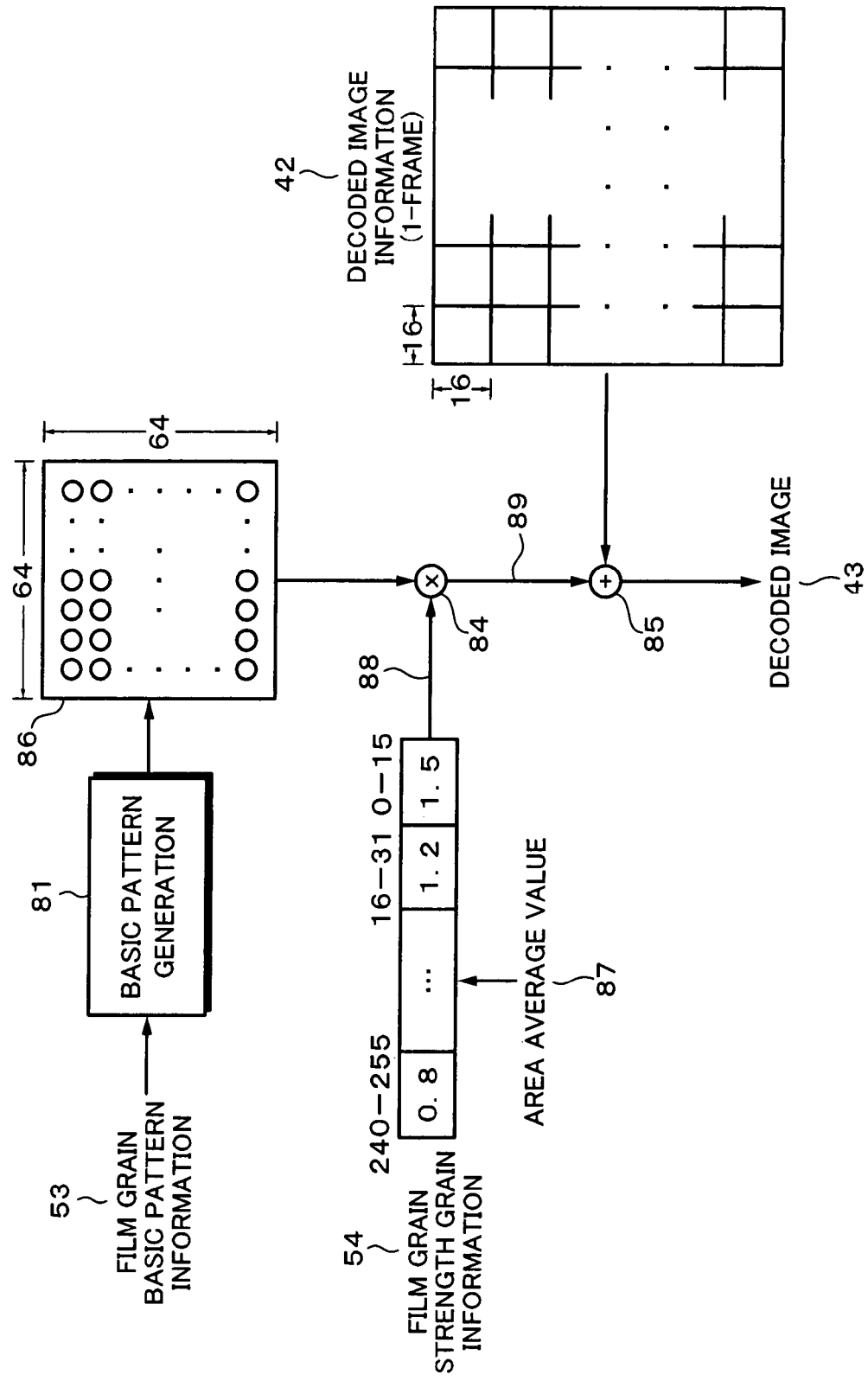
FIG. 10 is a schematic diagram for schematically explaining film grain adding processing.

FIG. 10 explains schematically reconstruction processing of the film grain image on the decoding side. The film grain basic pattern 86 whose noise histogram is substantially the same as the film grain basic pattern information 53 is generated by the basic pattern generating unit 81. The film grain basic pattern 86 is of (64×64) pixels and an area of (16×16) pixels is cut out and supplied to the multiplier 84.

The film grain strength information 54 is created on the encoding side and stored and the strength information 88 is outputted corresponding to the average value 87 of pixel values in (16×16) pixel area of the decoded image information 42. The strength of the basic pattern 86 is adjusted by this strength information 88. The film grain image 89 whose strength is adjusted is added to the area of the (16×16) pixels of the decoded image information 42 by the adder 85 by the unit of the pixel.

Figure 11:
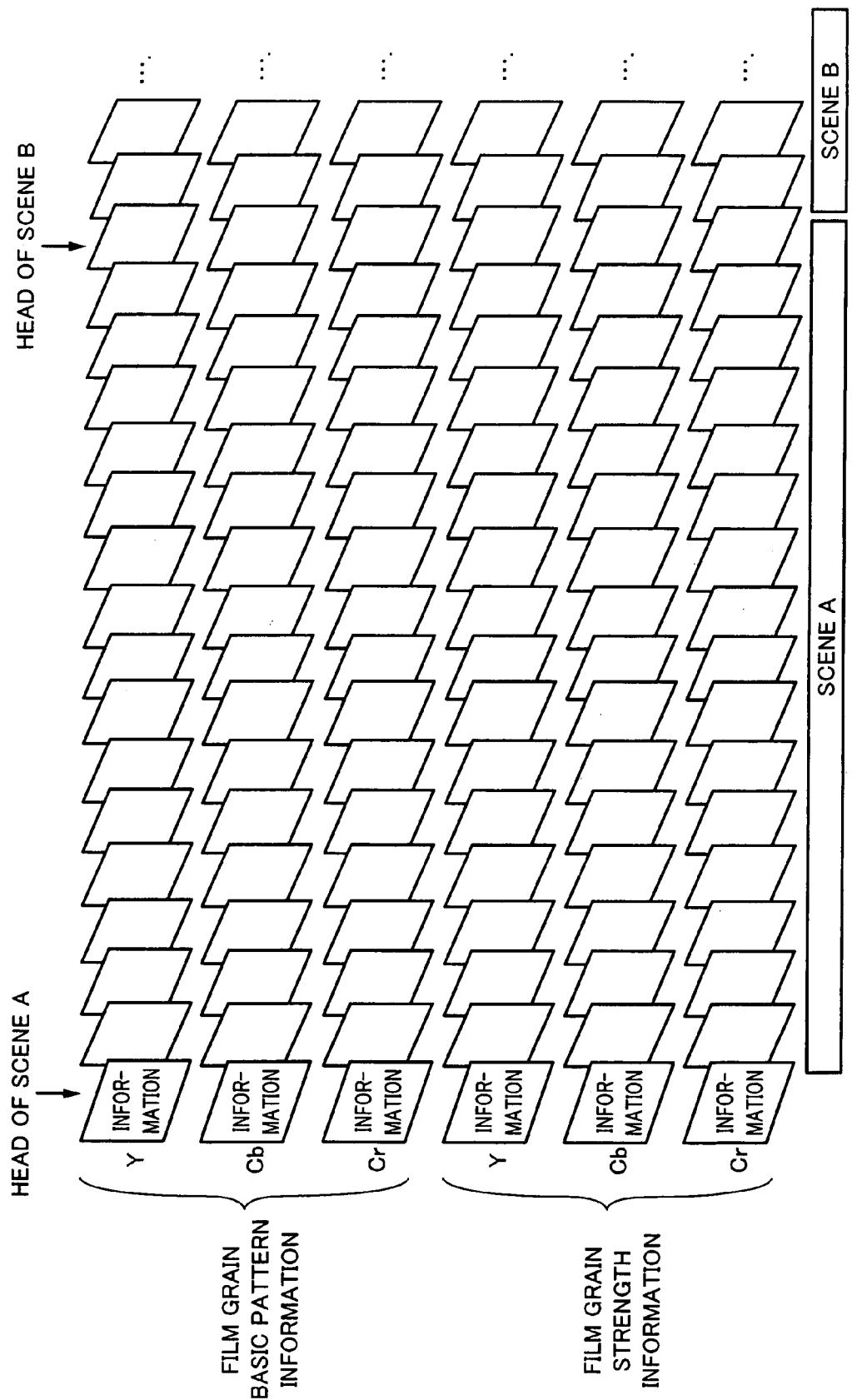
FIG. 11 is a timing chart for explaining a first method of film grain information extraction and film grain adding processing.

Next, some methods of processing for extraction of the film grain information and reconstruction of the film grain image will be described by taking a case of the component video signal as an example. FIG. 11 shows a first processing method. According to the first processing method, the film grain basic pattern information and film grain strength information are extracted for each of the components Y, Cr and Cb so as to extract these information pieces from each frame. The figure shows an image signal in which scene A and scene B exist. On the decoding side, the film grain is reconstructed using the film grain basic pattern information and film grain strength information of each frame for each of the components Y, Cr and Cb.

Figure 12:
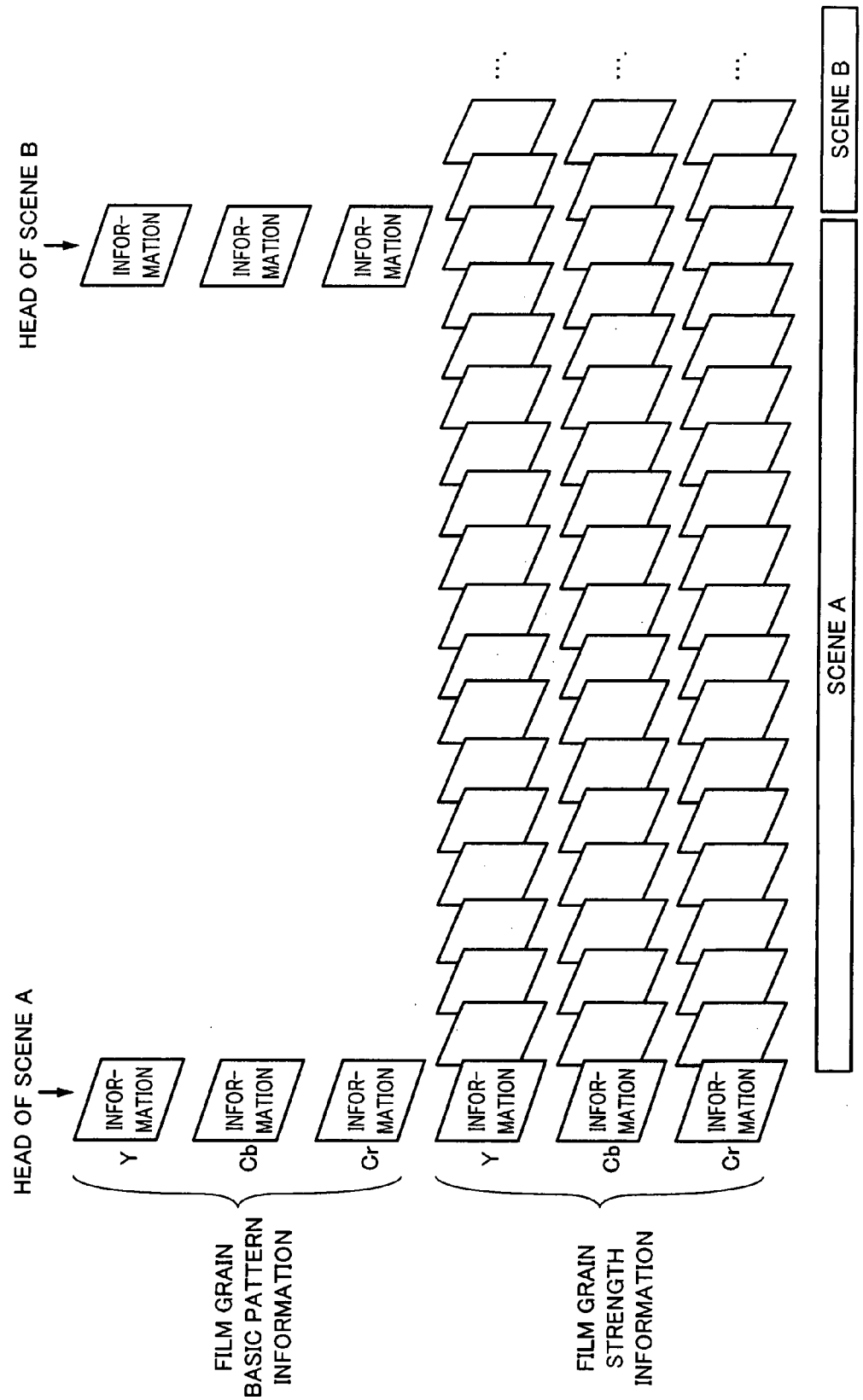
FIG. 12 is a timing chart for explaining a second method of the film grain information extraction and film grain adding processing.

FIG. 12 shows a second processing method. According to the second processing method, the film grain basic pattern information and the film grain strength information are extracted for each of the components Y, Cr and Cb. The film grain basic pattern information is extracted at only a frame at the head of each scene. On the decoding side, extracted basic pattern information is used commonly for all the frames in the same scene. The film grain strength information is extracted for each component like the first processing method in each frame.

Figure 13:
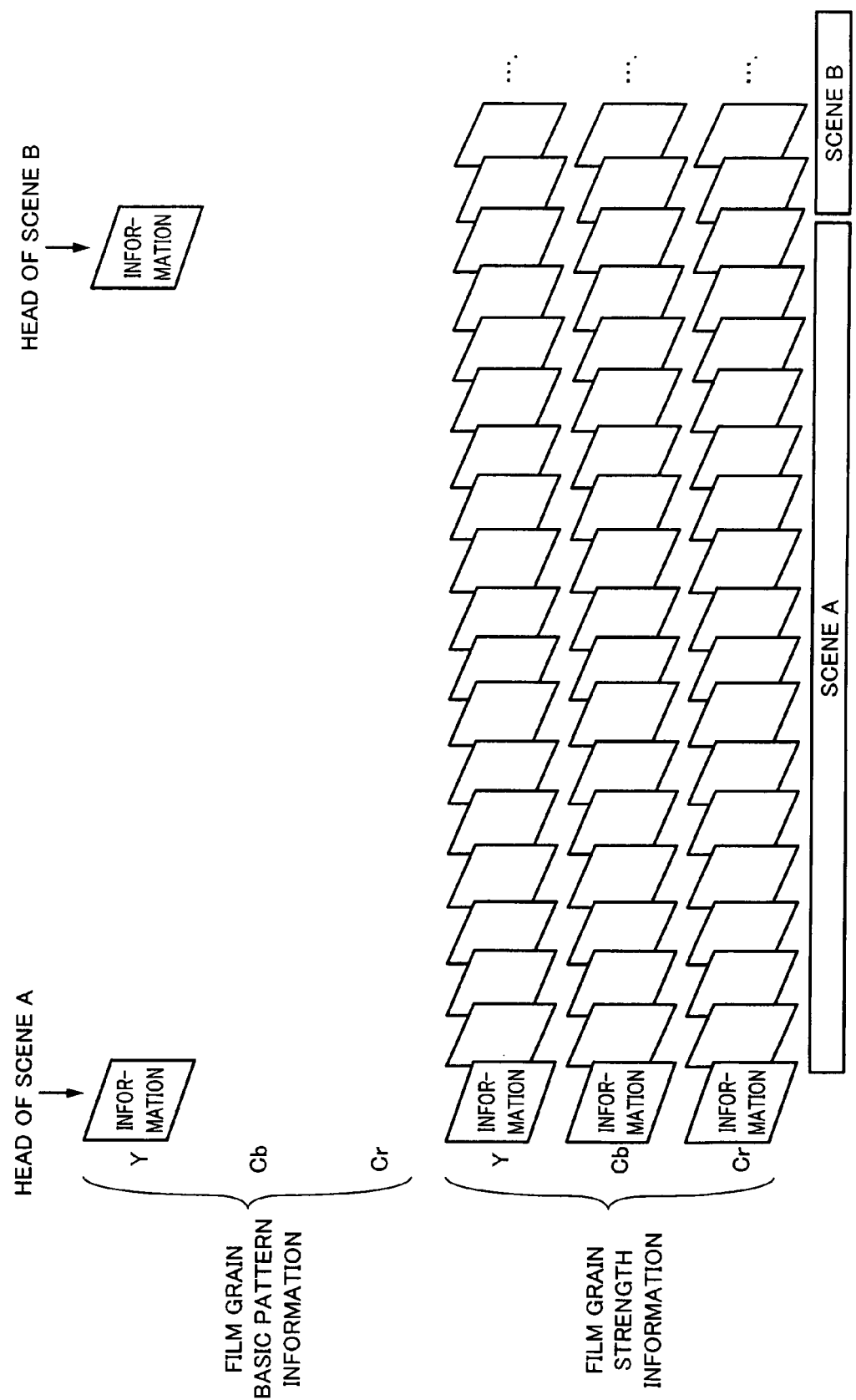
FIG. 13 is a timing chart for explaining a third method of the film grain information extraction and film grain adding processing.

FIG. 13 shows a third processing method. According to the third processing method, the film grain basic pattern information is extracted from only the brightness signal Y in the component. The film grain basic pattern information is extracted in only a frame at the head of each scene. On the decoding side, the extracted basic pattern information is used commonly for all frames and all components of the same scene. The film grain strength information is extracted for each component like the first processing method in each frame.

Figure 14:
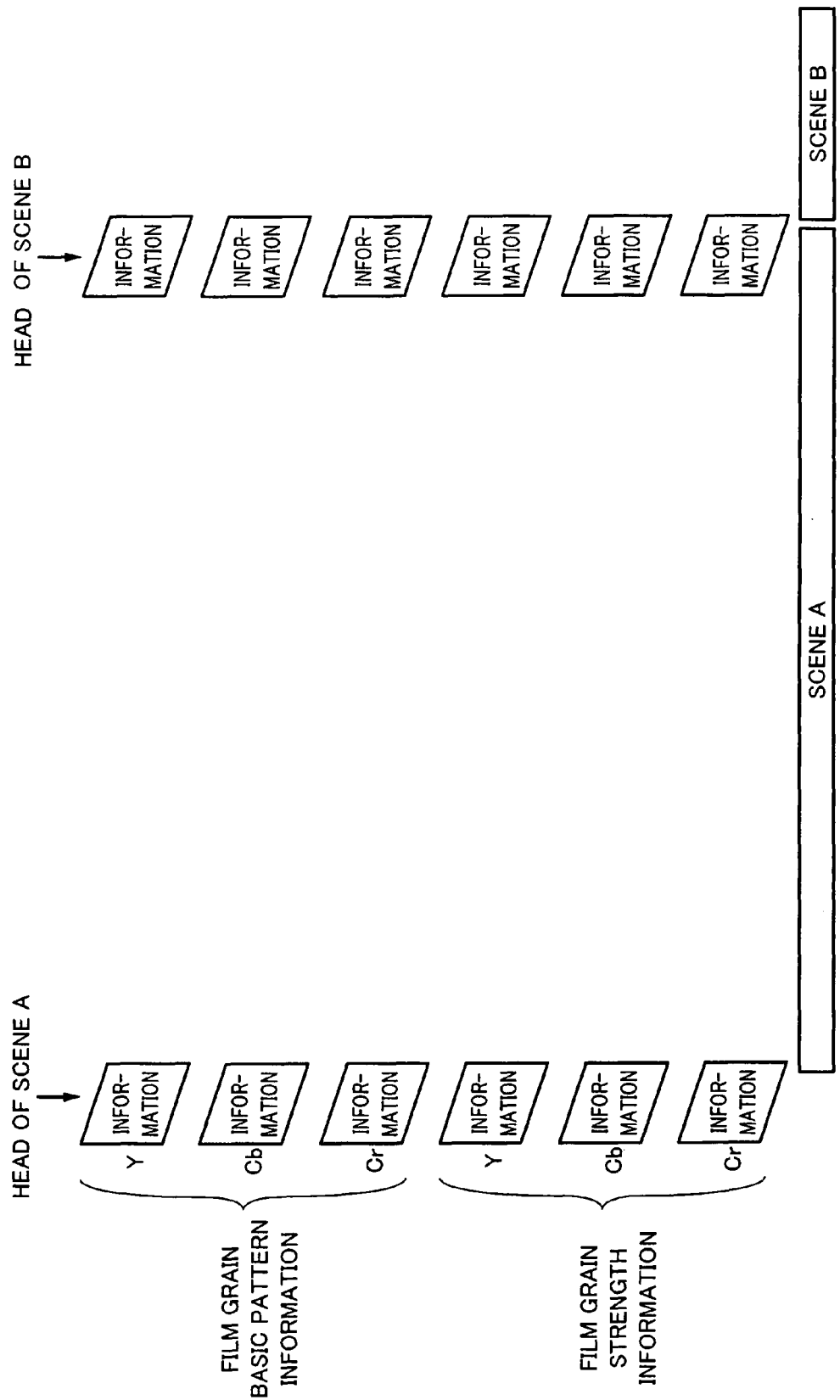
FIG. 14 is a timing chart for explaining a fourth method of the film grain information extraction and film grain adding processing.

FIG. 14 shows a fourth processing method. According to the fourth processing method, the film grain basic pattern information and film grain strength information are extracted for each of the components Y, Cr and Cb. Both the film grain basic pattern information and film grain strength information is extracted in only a frame at the head of each scene. On the decoding side, the extracted basic pattern information and strength information are used commonly for all the frames in the same scene.

Figure 15:
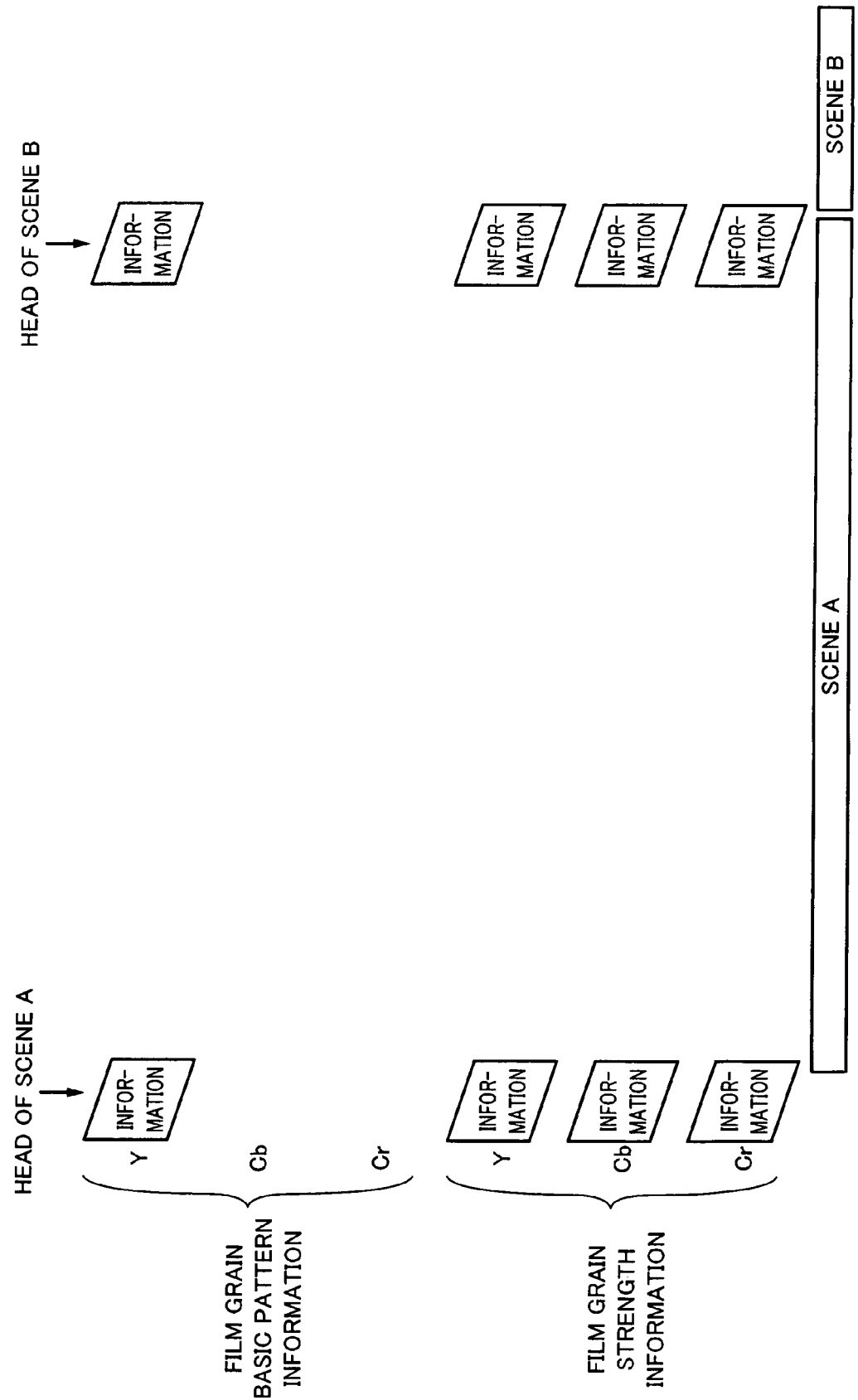
FIG. 15 is a timing chart for explaining a fifth method of the film grain information extraction and film grain adding processing.

FIG. 15 shows a fifth processing method. According to the fifth processing method, the film grain basic pattern information is extracted from the brightness signal Y in the components. The film grain basic pattern information is extracted in only a frame at the head of each scene. On the decoding side, the extracted basic pattern information is used commonly for all the frames and all the components in the same scene. The film grain strength information is extracted for each of the components Y, Cr and Cb. The film grain strength information is extracted in only a frame at the head of each scene. On the decoding side, the extracted film grain strength information is used commonly for each component in all the frames of the same scene.

FIG. 16 shows a sixth processing method. According to the sixth processing method, both the film grain basic pattern information and the film grain strength information are extracted from only the brightness signal Y in the components. On the decoding side, both the extracted basic pattern information and strength information are used commonly for all the frames and all the components in the same scene.

Of the above-described first to sixth processing methods, an appropriate method is used considering the relation between image quality improvement effect by adding the film grains and the quantity of data of the film grain information to be transmitted. Further, the first to sixth processing methods may be so constructed that two or more thereof can be selected and may be switched over by user's operation.

The embodiments of the present invention have been described specifically above. The present invention is not restricted to the above-described embodiments but may be modified in various ways based on the technical spirit of the invention. For example, as for the division method of the sub-band, it may be divided to two sections in the horizontal frequency direction and vertical frequency direction so as to produce four sub-bands. Further, as a method of processing the noise components according to the film grain basic pattern information, other than the above-mentioned algorithm may be adopted. Further, the present invention allows use of other encoding method such as MPEG2 than the MPEG-4 AVC (or H.264) as a high efficiency encoding method for animation.

According to the present invention, the film grain information lost on the decoding side is extracted efficiently on the encoding side and transmitted to the decoding side or recorded in the recording medium. On the decoding side, the film grain information to be added to an image is reconstructed from the obtained information and added to the decoded image. Consequently, the decoded image is provided with film texture so that the image quality can be improved largely.

The invention claimed is:

1. An image processing apparatus for encoding of an input image signal, comprising:
    first extracting means for extracting basic pattern information indicating a level distribution of pixel values in a uniform area containing no steep change in an input image;
    second extracting means for extracting strength information indicating a strength of a film grain to be added corresponding to an average value of the pixels in the uniform area; and
    means for transmitting or recording encoded data, the basic pattern information and the strength information.

2. The image processing apparatus according to claim 1, wherein the first extracting means is an image processing apparatus employing a frequency distribution of pixel values in the area as the basic pattern information.

3. The image processing apparatus according to claim 1, wherein the first extracting means is an image processing apparatus for dividing the pixels in the area into a plurality of frequency bands and extracting the basic pattern for each frequency band.

4. The image processing apparatus according to claim 1, wherein the first and second extracting means detect the basic pattern information and the strength information for each frame in the input image.

5. The image processing apparatus according to claim 1, wherein the first and second extracting means detect the basic pattern information and the strength information for each scene in the input image.

6. The image processing apparatus according to claim 1, wherein one of the first and second extracting means detects one of the basic pattern information and the strength information for each frame of the input image while the other of the first and second extracting means detects the other of the basic pattern information and the strength information for each scene of the input image.

7. An image processing apparatus for decoding encoded data, comprising:
    receiving means for receiving the encoded data, encoding basic pattern information indicating a level distribution of pixel values in a uniform area containing no steep change in the input image and strength information indicating an extent of adding film grain corresponding to an average value of the pixels in the uniform area;
    decoding means for decoding the encoded data received by the receiving means;
    basic pattern generating means for reconstructing a film grain image by converting a level distribution of random noise to a same one as the level distribution indicated in the basic pattern information received by the receiving means;

strength adjusting means for adjusting the strength of the film grain image according to the strength information received by the receiving means; and adding means for adding the film grain image whose strength is adjusted to decoded image information obtained by the decoding means.

8. The image processing apparatus according to claim 7, wherein an area in the film grain image generated by the basic pattern generating means is cut out and added to the decoded image information.

9. The image processing apparatus according to claim 8, wherein the position of the cut out area is changed at random.

10. The image processing apparatus according to claim 7, wherein the strength adjusting means adjusts the strength in each specified area in the image.

11. An image processing method for encoding an input image signal, comprising:
- a first extracting step of extracting basic pattern information indicating a level distribution of pixel values in a uniform area containing no steep change in an input image;
- a second extracting step of extracting strength information indicating the strength of a film grain to be added corresponding to an average value of the pixels in the uniform area; and
- a step of transmitting or recording encoded data, the basic pattern information and the strength information.

12. An image processing method for decoding encoded data, comprising:
- a receiving step of receiving the encoded data, encoding basic pattern information indicating a level distribution of pixel values in a uniform area containing no steep change in the input image and strength information indicating an extent of adding film grain corresponding to an average value of the pixels in the uniform area;
- a decoding step of decoding the encoded data received in the receiving step;
- a basic pattern generating step of reconstructing a film grain image by converting a level distribution of random noise to the same one as the level distribution indicated in the basic pattern information received in the receiving step;
- a strength adjusting step of adjusting the strength of the film grain image according to the strength information received in the receiving step; and
- an adding step of adding the film grain image whose strength is adjusted to decoded image information obtained in the decoding step.

* * * * *